(12) United States Patent
Suh (10) Patent No.: US 12,017,713 B2
(45) Date of Patent: Jun. 25, 2024

(54) APPARATUS FOR ASSISTING STEERING OF VEHICLE AND CONTROL METHOD THEREOF

(71) Applicants: Hyundai Motor Company, Seoul (KR); Kia Corporation, Seoul (KR)

(72) Inventor: Jee Yoon Suh, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 345 days.

(21) Appl. No.: 17/476,191

(22) Filed: Sep. 15, 2021

(65) Prior Publication Data

US 2022/0289284 A1 Sep. 15, 2022

(30) Foreign Application Priority Data

Mar. 11, 2021 (KR) ........................ 10-2021-0032227

(51) Int. Cl.
*B62D 6/00* (2006.01)
*B62D 5/04* (2006.01)
*B62D 15/02* (2006.01)

(52) U.S. Cl.
CPC ............. *B62D 6/00* (2013.01); *B62D 5/0463* (2013.01); *B62D 15/021* (2013.01)

(58) Field of Classification Search
CPC ...... B62D 6/00; B62D 5/0463; B62D 15/021; B62D 6/04; B62D 5/0418; B62D 6/02; B62D 7/18

USPC .......................................................... 701/41
See application file for complete search history.

(56) References Cited

U.S. PATENT DOCUMENTS

| 8,108,134 | B2 * | 1/2012 | Kageyama | ........... G06V 20/588 382/104 |
| 2014/0145498 | A1 * | 5/2014 | Yamakado | .............. B60T 8/245 303/3 |
| 2017/0001658 | A1 * | 1/2017 | Takagi | ................. B62D 5/0409 |
| 2020/0377150 | A1 * | 12/2020 | Hidaka | ................ B62D 5/0484 |
| 2022/0073134 | A1 * | 3/2022 | Nitta | ..................... B62D 6/007 |
| 2022/0081023 | A1 * | 3/2022 | Miyake | ................ B62D 5/0421 |

\* cited by examiner

*Primary Examiner* — Yi-Kai Wang
(74) *Attorney, Agent, or Firm* — MORGAN, LEWIS & BOCKIUS LLP (57) ABSTRACT

An apparatus of assisting steering of a vehicle, may include a turning direction recognizer that recognizes a turning direction of a tire, by use of a steering angle controlled through manipulation of a handle; and a tire driving controller that determines a tire, to which a first driving force for generating a steering assisting torque that assists turning of the tire to the recognized turning direction is applied, and a tire, to which a second driving force for offsetting the first driving force to maintain a forward/rearward force of the vehicle at 0 is applied, and controls driving motors provided in the tires, respectively, to generate the first driving force and the second driving force, whereby the tire may be turned with a steering torque of a limit steering torque or more which may be generated by the steering motor, and a control method thereof.

16 Claims, 6 Drawing Sheets

APPARATUS FOR ASSISTING STEERING OF VEHICLE AND CONTROL METHOD THEREOF

CROSS-REFERENCE TO RELATED APPLICATION

The present application claims priority to Korean Patent Application No. 10-2021-0032227, filed on Mar. 11, 2021, the entire contents of which is incorporated herein for all purposes by this reference.

BACKGROUND OF THE INVENTION

Field of the Invention

The present invention relates to an apparatus of assisting steering of a vehicle, which may additionally supply a torque required for the steering of the vehicle which is stopped from a driving motor, and a control method thereof.

Description of Related Art

In general, when a vehicle is steered by use of a motor-driven power steering (MDPS), the steering torques applied to respective tires for steering of a desired angle are different according to whether the vehicle is driven or stopped.

That is, a higher steering torque is necessary when the vehicle is stopped than when a frictional coefficient between a tire and a road surface, on which the vehicle travels, is small, and the necessary steering torque increases as the steering angle increases. Accordingly, the highest steering torque is necessary in a full turn condition, in which the steering angle is maximally operated in the stop state.

Furthermore, because a driving motor for generating a driving force as well as a steering motor for generating a steering torque in the tires have to be provided in a four-wheel independent steering wheel in which all the four tires may be driven independently, there is a spatial limitation in increasing the capacity and the magnitude of the steering torque.

Accordingly, an apparatus which may satisfy a steering torque which is necessary during a full turn in a stop state, in which the highest steering torque is required during the steering while an increase in the capacity of the steering motor is minimized.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus of assisting steering of a vehicle, which includes a turning direction recognizer that recognizes a turning direction of a tire, to which the vehicle is turned, by use of a steering angle controlled through manipulation of a handle; and a tire driving controller that determines a tire, to which a first driving force for generating a steering assisting torque that assists turning of the tire to the recognized turning direction is applied, and a tire, to which a second driving force for offsetting the first driving force to maintain a forward/rearward force of the vehicle at 0 is applied, and controls driving motors provided in the tires, respectively, to generate the first driving force and the second driving force, whereby the tire may be turned with a steering torque of a limit steering torque or more which may be generated by the steering motor, and a control method thereof.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, an apparatus of assisting steering of a vehicle includes a turning direction recognizer that recognizes a turning direction of a tire, to which the vehicle is turned, by use of a steering angle controlled through manipulation of a handle, and a tire driving controller that determines a tire, to which a first driving force for generating a steering assisting torque that assists turning of the tire to the recognized turning direction is applied, and a tire, to which a second driving force for offsetting the first driving force to maintain a forward/rearward force of the vehicle at 0 is applied, and control driving motors provided in the tires, respectively, to generate the first driving force and the second driving force.

Furthermore, the apparatus may further include a stop determiner that proactively determines whether the vehicle is stopped, by use of a wheel speed of the vehicle.

Furthermore, the tire driving controller may determine, as tires to which the first driving force is to be applied, an external front wheel of the vehicle with reference to the turning direction, to which the tire is turned, as a tire, to which a positive (+) driving force is to be applied, and an internal front wheel of the vehicle as a tire, to which a negative (−) driving force is to be applied.

Furthermore, the tire driving controller may determine, as tires to which the second driving force is to be applied, an internal rear wheel of the vehicle with reference to the turning direction, to which the tire is turned, as a tire, to which a positive (+) driving force is to be applied, and an external rear wheel of the vehicle as a tire, to which a negative (−) driving force is to be applied.

Furthermore, the tire driving controller may perform a control to, when the vehicle in a stop state, is steered to be turned to the left, apply, as the first driving force, a positive (+) driving force to a right front wheel of the vehicle and a negative (−) driving force to a left front wheel of the vehicle, and apply, as the second driving force, a positive (+) driving force to a left rear wheel of the vehicle and a negative (−) driving force to a right rear wheel of the vehicle.

Furthermore, the tire driving controller may perform a control to, when the vehicle in a stop state, is steered to be turned to the right, apply, as the first driving force, a positive (+) driving force to a left front wheel of the vehicle and a negative (−) driving force to a right front wheel of the vehicle, and apply, as the second driving force, a positive (+) driving force to a right rear wheel of the vehicle and a negative (−) driving force to a left rear wheel of the vehicle.

Furthermore, the apparatus may further include a moment arm calculator that determines, in advance, data that represent an increment relationship of the steering angle and a moment arm by use of specification feature values of the vehicle, including installation locations of a kingpin shaft and a steering motor and an offset of a motor shaft, store the data in a memory, and recognizes a length of the moment arm, which is changed when the tire is turned, from the memory by use of a magnitude of the steering angle.

Furthermore, the apparatus may further include a steering assistance determiner that determines a magnitude of a necessary steering torque required to turn the tire in a left turn or right turning direction in a state, in which the vehicle is stopped, according to the magnitude of the steering angle, and determines to assist a portion of the necessary steering torque with the first and second driving forces generated by the driving motors when the necessary steering torque is more than a limit steering torque generated by a steering motor.

Furthermore, the steering assistance determiner may determine a ratio of, in the necessary steering torque, a steering torque which is to be generated by the steering motor and the steering assisting torque which is to be generated by the driving motors.

According to various aspects of the present invention, a method for controlling assistance of steering of a vehicle includes a turning direction recognizing operation of recognizing a turning direction of a tire, to which the vehicle is turned, by use of a steering angle controlled through manipulation of a handle, and a tire driving controlling operation of determining a tire, to which a first driving force for generating a steering assisting torque that assists turning of the tire to the recognized turning direction, and a tire, to which a second driving force for offsetting the first driving force to maintain a forward/rearward force of the vehicle at 0, and controlling driving motors provided in the tires, respectively, to generate the first driving force and the second driving force.

Furthermore, the method may further include a vehicle stop determining operation of determining whether the vehicle is stopped by use of a wheel speed of the vehicle before a change of the steering angle is recognized in the turning direction recognizing operation.

Furthermore, the tire driving controlling operation may include an operation of determining, as tires to which the first driving force is to be applied, an external front wheel of the vehicle with reference to the turning direction, to which the tire is turned, as a tire, to which a positive (+) driving force is to be applied, and an internal front wheel of the vehicle as a tire, to which a negative (−) driving force is to be applied.

Furthermore, the tire driving controlling operation may include an operation of determining, as tires to which the second driving force is to be applied, an internal rear wheel of the vehicle with reference to the turning direction, to which the tire is turned, as a tire, to which a positive (+) driving force is to be applied, and an external rear wheel of the vehicle as a tire, to which a negative (−) driving force is to be applied.

Furthermore, the method may further include an operation of, before the tire driving controlling operation, determining a magnitude of a necessary steering torque required to turn the tire in a left turn or right turning direction in a state, in which the vehicle is stopped, according to the magnitude of the steering angle, and determining to assist a portion of the necessary steering torque with the first and second driving forces generated by the driving motors when the necessary steering torque is more than a limit steering torque generated by a steering motor.

Furthermore, the steering assistance determining operation may include an operation of determining a ratio of, in the necessary steering torque, a steering torque which is to be generated by the steering motor and the steering assisting torque which is to be generated by the driving motors.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIGS. 1 to 6.

Figure 1:
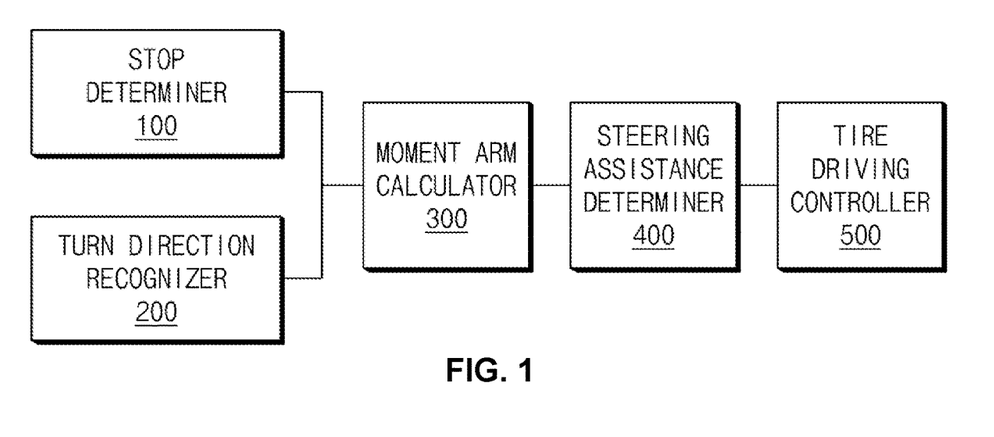
FIG. 1 is a block diagram of an apparatus of assisting steering of a vehicle according to various exemplary embodiments of the present invention.

FIG. 1 is a block diagram of an apparatus of assisting steering of a vehicle according to various exemplary embodiments of the present invention.

Referring to FIG. 1, an apparatus of assisting steering of a vehicle according to various exemplary embodiments of the present invention may include a turning direction recognizer 200 that recognizes a turning direction of a tire, to which the vehicle is turned, by use of a steering angle controlled through manipulation of a handle; and a tire driving controller 500 that determines a tire, to which a first driving force for generating a steering assisting torque that assists turning of the tire to the recognized turning direction, and a tire, to which a second driving force for offsetting the first driving force to maintain a forward/rearward force of the vehicle at 0, and controls driving motors provided in the tires, respectively, to generate the first driving force and the second driving force.

The turning direction recognizer 200 may recognize whether a turning direction of a tire is a right turn or a left turn based on a change of the steering angle through manipulation of a handle.

That is, because the tire, to which the first driving force is to be applied, and the tire, to which the second driving force is to be applied, are differently determined by the tire driving controller 500 according to the turning direction, the turning direction recognizer 200 may recognize whether the vehicle is to be turned to the right or to the left first.

Accordingly, the present invention is configured to generate a steering assisting moment by the driving force of the tire during a steering operation in a stop state, in which a high steering torque is required, and may further include a stop determiner 100 that proactively determines whether the vehicle is stopped, by use of a wheel speed of the vehicle.

The stop determiner 100 may determine whether the vehicle is in a stop state based on whether a wheel speed of the tire, which is acquired from a wheel speed sensor provided in the vehicle, is 0 or gear information of an automatic transmission acquired by an electronic control unit (ECU) of the vehicle corresponds to a parking state.

When a steering operation is made by use of motor-driven power steering (MDPS), a steering motor has to generate a steering torque for turning a tire by a steering angle and a steering moment for turning in a steering direction has to be applied to the tire.

Figure 3:
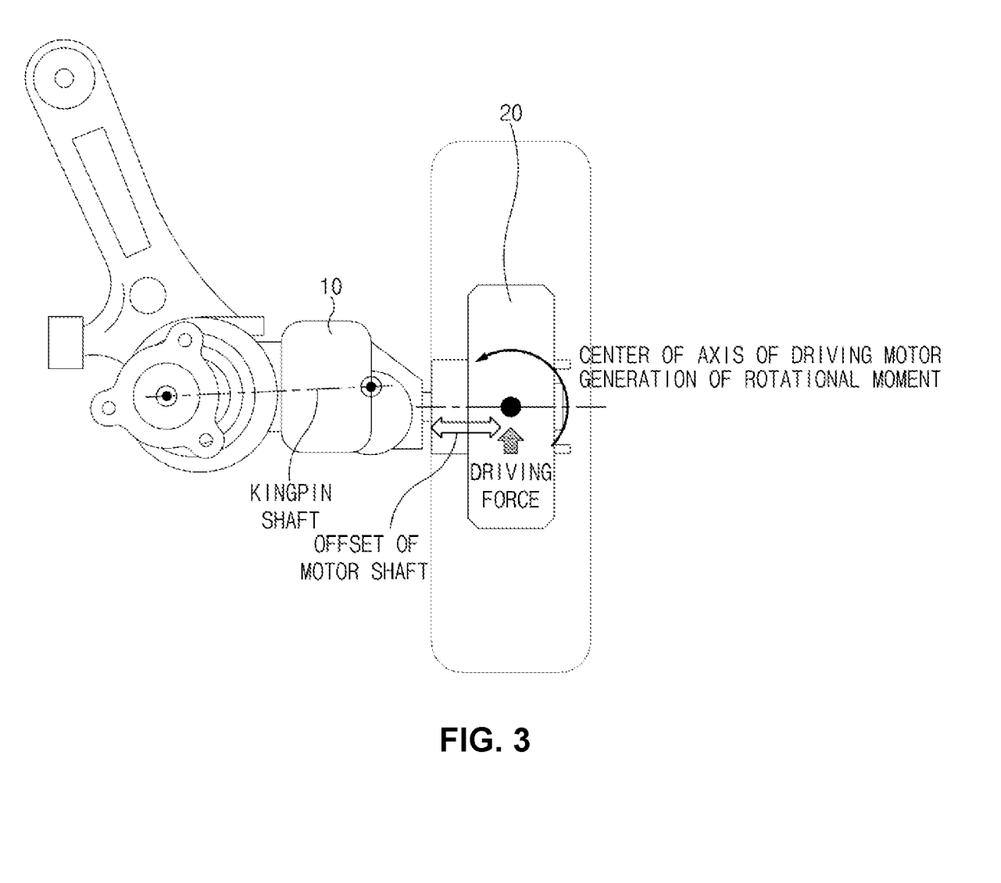
FIG. 3 and FIG. 4 are a plan view and a rear view exemplarily illustrating that a driving force is additionally applied to a tire of a four-wheel independent steering vehicle which is being steered according to various exemplary embodiments of the present invention.
Figure 4:
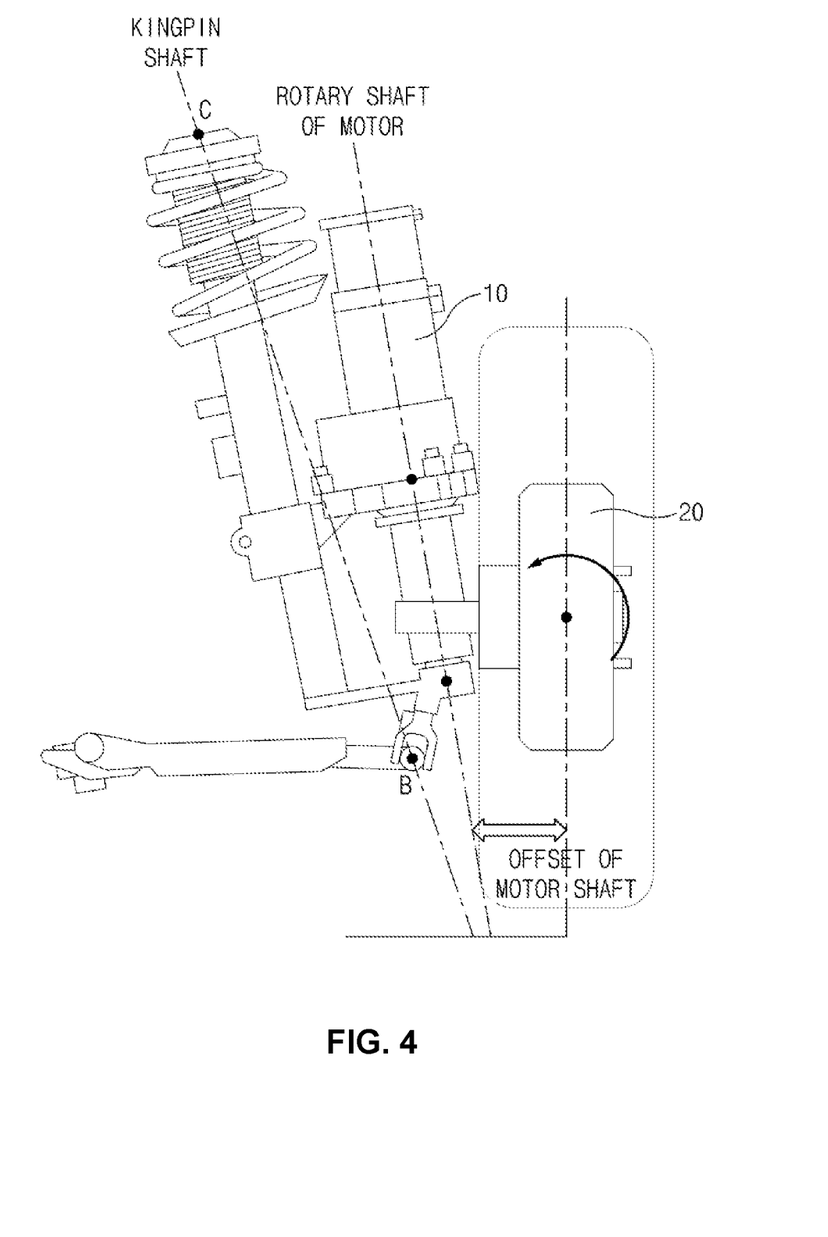

Accordingly, to generate the steering torque for turning the tire, as illustrated in FIG. 3 and FIG. 4, a steering motor is provided on one side of the tire to generate a steering moment for turning the tire as the handle is moved.

Accordingly, FIG. 3 and FIG. 4 illustrate an example of a tire provided in a 4-wheel independent steering vehicle, in which all the four tires may be independently steered and driven. Accordingly, each of the tires may be provided with a steering motor 10 that generates a steering torque for turning the tire in a steering direction, and a driving motor 20 that generates a forward/rearward driving force for the tire.

FIG. 3 and FIG. 4 illustrate that the steering motor 10 is provided on one side of the tire and the driving motor 20 is provided in an interior of the tire. Furthermore, a kingpin shaft is obliquely coupled to one side of the tire as a steering shaft for delivering a steering manipulation caused by the handle to the tire. Accordingly, because both of the kingpin shaft and the steering motor have to be provided on one side of the tire, there is a spatial limitation in increasing a size of the steering motor itself to increase a capacity of the steering motor.

In the present way, because the kingpin shaft and the steering motor are obliquely provided on the one side of the tire, the steering moment applied to the tire which is turned through the steering manipulation becomes different according to the steering angle, by which the tire is to be turned. That is, as the steering angle increases, the steering moment that has to be applied for turning of the tire also increases.

Figure 2A:
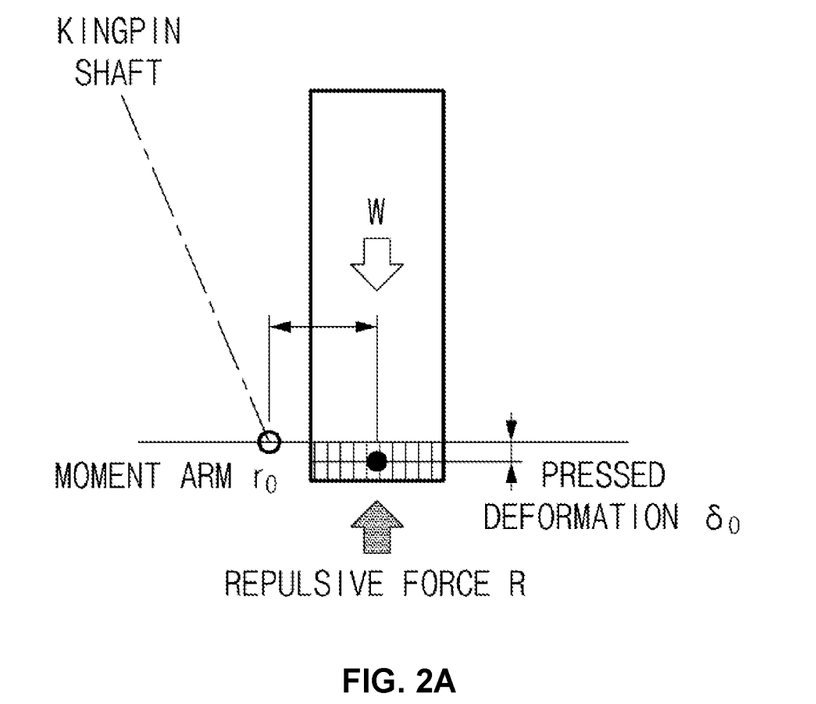
FIG. 2A and FIG. 2B are exemplary views exemplarily illustrating that a length of a moment arm is changed when a vehicle is steered.

That is, as illustrated in FIG. 2A, in a zero turn situation, in which the steering angle is 0°, the tire is deformed by a vertical moment "W" which is applied while a gross vehicle weight (GVW) of the vehicle presses the ground and a repulsive force "R" of the ground surface and a specific pressed deformation δ0 appears.

Figure 2B:
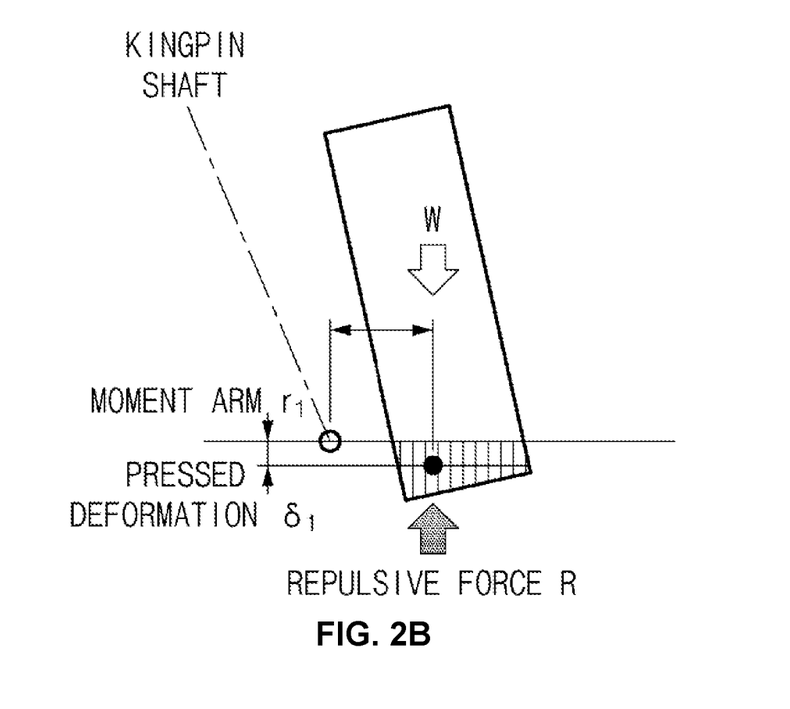

That is, as illustrated in FIG. 2B, even in a full turn situation, in which the steering angle is a maximum angle, the tire is deformed by a vertical moment "W" which is applied while a gross vehicle weight (GVW) of the vehicle presses the ground and a repulsive force "R" of the ground surface and a specific pressed deformation δ1 appears.

Accordingly, the vertical moment "W" applied to the ground surface by the tire becomes higher as the steering angle of the vehicle increases, that is, in the full turn situation than in the zero turn situation, and accordingly, the pressed deformation due to the deformation of the tire also increases.

Furthermore, as illustrated in FIG. 2A and FIG. 2B, as a length of a moment arm r1 from the kingpin shaft to the center portion of the tire in the full turn situation becomes longer than a length of a moment arm r0 from the kingpin shaft to the center portion of the tire in the zero turn situation, the vertical moment also increases, and the steering moment (or also referred to as a kingpin moment) required to steer the tire also increases.

In general, a higher steering moment is required for steering for turning during a stop of the vehicle which is influenced by a stationary frictional coefficient than while driving of the vehicle which is influenced by a kinetic frictional coefficient when the vehicle is turned, and a higher steering torque which may satisfy the steering moment is necessary.

Accordingly, because a steering torque which is necessary to turn the tire has to be generated by the steering motor, the size of the steering motor also has to be increased because the steering motor has to have a capacity for sufficiently generating the steering torque which is necessary for a full turn during the stop of the vehicle, in which the highest steering torque is required.

In consideration that a steering torque of a maximum magnitude is not always required by the steering motor, the present invention supplies a steering moment which is necessary for manipulation of the steering of the vehicle only with the steering torque generated by the steering motor 10, but supplements an insufficient steering torque with the driving force generated by the driving motor 20 provided in the tire as in Equation 1 when a steering moment that exceeds a limit steering torque which may be generated by the steering motor is required (for example, a left turn or a right turn is made by a maximum steering angle in a stop state of the vehicle, that is, in a full turn state).

Necessary steering torque=Steering torque+(Offset of motor shaft×Driving force)　　　[Equation 1]

Accordingly, the driving force generated by the driving motor 20, as illustrated in FIG. 4, is applied at a location which is spaced from a rotary motor shaft of the steering motor 10 by a distance corresponding to an offset of the motor shaft, and Equation 1 represents the steering assisting torque that contributes to steering of the tire by a product of "the offset of the motor shaft" and "the driving force".

In the present way, because the steering torque that has to be generated by the steering motor 10 may not be increased by performing a control to secondarily supply a portion of the necessary steering torque for turning of the tire with the driving force of the driving motor 20, an increase in the weight of the steering motor and an increase of costs may be alleviated, and an installation space of an internal area of the tire may be minimized due to reduction of the volume of the steering motor.

Furthermore, the tire driving controller 500 may determine a tire, to which the first driving force for generating a steering assisting torque that induces turning to the turning direction recognized by the turning direction recognizer 200, and may generate the first driving force that assists turning of the tire by controlling the driving motor 20 provided in the determined tire.

Figure 5A:
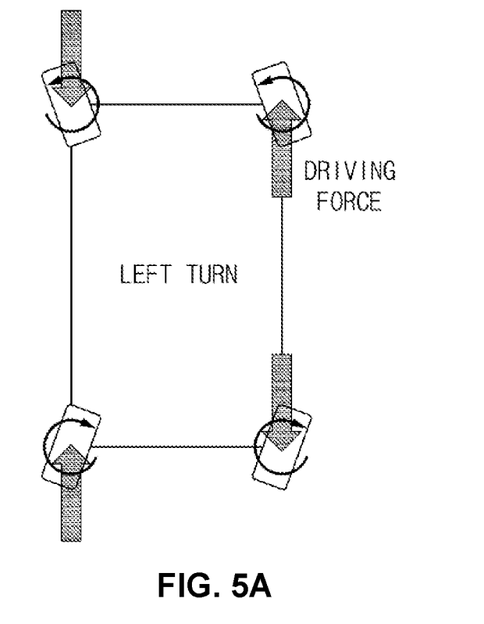
FIG. 5A and FIG. 5B are exemplary views exemplarily illustrating that driving forces for generating steering assisting moments are additionally applied to tires of a four-wheel independent steering vehicle according to various exemplary embodiments of the present invention.
Figure 5B:
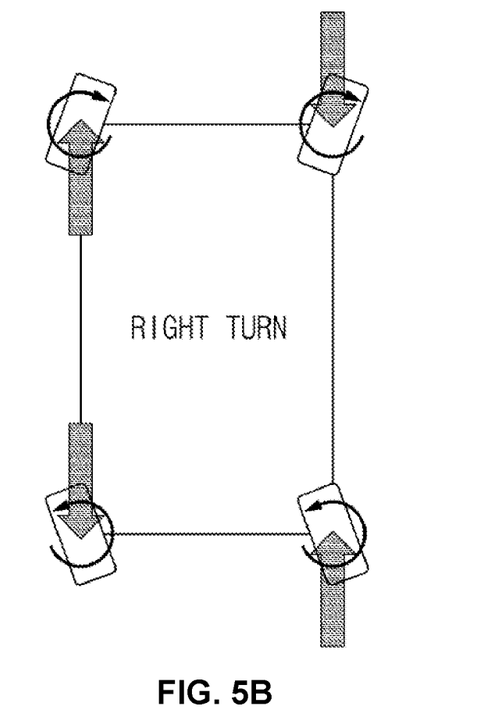

The tire driving controller 500, as illustrated in FIG. 5A and FIG. 5B, may determine, as tires to which the first driving force is to be applied, an external front wheel of the vehicle with reference to the turning direction, to which the tire is turned, as a tire, to which a positive (+) driving force is to be applied, and an internal front wheel of the vehicle as a tire, to which a negative (−) driving force is to be applied.

Accordingly, the positive (+) driving force generated by the driving motor 20 refers to power that rotates the tire in a forward direction and the negative (−) driving force refers to power that rotates the tire in a rearward direction.

Because the rotation center of the moment arm is generally located inside the vehicle, the positive (+) driving force applied to the tire causes a toe-in and the negative (−) driving force applied to the tire causes a toe-out.

Accordingly, the external front wheel with reference to the turning direction has to be a toe-in and the internal front wheel has to be a toe-out to generate the steering assisting moment for turning the tire to the turning direction, the driving controller may perform a control to apply the positive (+) driving force to the external front wheel and apply the negative (−) driving force to the internal front wheel.

Accordingly, because the tire driving controller 500 utilizes the driving force of the driving motor only to assist a portion of the steering torque when the steering angle is large, as in the full turn situation in the stop state of the vehicle, the vehicle has to maintain the stop state.

Accordingly, the tire driving controller 500 may determine the tire, to which the second driving force for maintaining the vehicle in the stop state by offsetting the first driving force applied to the tire to generate the steering assisting torque, and may generate the second driving force for maintaining the forward/rearward force of the vehicle at 0 by controlling the driving motor 20 provided in the determined tire.

The tire driving controller 500 may determines, as tires to which the second driving force is to be applied, an internal rear wheel of the vehicle with reference to the turning direction, to which the tire is turned, as a tire, to which a positive (+) driving force is to be applied, and an external rear wheel of the vehicle as a tire, to which a negative (−) driving force is to be applied.

Accordingly, as illustrated in FIG. 5A, when the vehicle in the stop state is to be steered to be turned to the left side, as the first driving force for generating the steering assisting moment, a positive (+) driving force may be applied to the right front wheel of the vehicle and a negative (−) driving force may be applied to the left front wheel, and as the second driving force for offsetting the first driving force to maintain the forward/rearward force at 0, a positive (+) driving force may be applied to the left rear wheel of the vehicle and a negative (−) driving force may be applied to the right rear wheel.

Accordingly, as illustrated in FIG. 5B, when the vehicle in the stop state is to be steered to be turned to the right side, as the first driving force for generating the steering assisting moment, a positive (+) driving force may be applied to the left front wheel of the vehicle and a negative (−) driving force may be applied to the right front wheel, and as the second driving force for offsetting the first driving force to maintain the forward/rearward force at 0, a positive (+) driving force may be applied to the right rear wheel of the vehicle and a negative (−) driving force may be applied to the left rear wheel.

Furthermore, the length of the moment arm becomes different according to the magnitude of the steering angle, by which the tire is to be turned, the moment generated as the steering torque generated by the steering motor is applied to the turning of the tire becomes different as the length of the moment arm changes.

Accordingly, the present invention may further include a moment arm calculator 300 that determines the length of the moment arm which is changed as the tire is turned, by use of the magnitude of the steering angle through manipulation of the handle.

The moment arm calculator 300 may determine, in advance, data that represent an increment relationship of the steering angle and a moment arm by use of specification feature values of the vehicle, including installation locations of a kingpin shaft and a steering motor and an offset of a motor shaft, may store the data in a storage unit, such as a memory.

Accordingly, when the magnitude of the steering angle increases through the manipulation of the steering, the moment arm calculator may recognize the length of the moment arm matched with the magnitude of the steering angle from the data stored in the memory and the like.

Furthermore, the present invention may further include a steering assistance determiner 400 that determines a magnitude of a necessary steering torque required to turn the tire in a left turn direction or a right turn direction in a state, in which the vehicle is stopped, according to the magnitude of the steering angle, and determines to assist a portion of the necessary steering torque with the driving force generated by the driving motor when the necessary steering torque is more than a limit steering torque generated by a steering motor.

When the handle of the vehicle is manipulated for a left turn or a right turn in the stop state of the vehicle, the length of the moment arm and the vertical moment may increase, and the necessary steering torque required to turn the tire of the vehicle also increases. Accordingly, the necessary steering torque that exceeds the limit steering torque which may be generated by the steering motor may be required.

Accordingly, the steering assistance determiner 400 may determine that a portion of the necessary steering torque may be burdened by the tire driving controller 500 when the necessary steering torque exceeds the limit steering torque. In the present way, when it is determined by the steering assistance determiner 400 that a portion of the necessary steering torque is burdened by the driving motor, a steering assisting torque may be generated by the tire driving controller 500.

Furthermore, the steering assistance determiner 400 may determine a ratio of, in the necessary steering torque, the steering torque which is to be generated by the steering motor 10 and the steering assisting torque which is to be generated by the driving motor 20.

Accordingly, the ratio of the auxiliary steering torque generated by the driving motor may be increased, but the auxiliary steering torque generated by the driving force of the driving motor is secondarily generated, and thus the driving motor may not burden an excessive ratio of the necessary steering torque.

Accordingly, the steering assistance determiner 400 may set such that the ratio of the auxiliary steering torque generated by the driving motor is burdened within a range of less than 10% of the entire necessary steering torque required for turning of the tire.

Furthermore, the steering assistance determiner 400 may match the magnitude of the necessary steering torque required to turn the tire to the right side or the left side in the stop state as the magnitude of the steering angle increases with the magnitude of the steering angle, may store the matching result in the memory, and may determine the necessary steering torque from the memory by use of the magnitude of the steering angle.

Furthermore, the steering assistance determiner 400 may control the generation of the steering torque by the steering motor and the generation of the steering assisting torque together by the driving motor only recognizing the magnitude of the steering angle, by storing, by the tire driving controller, the ratio and the magnitude of the steering torque which is to be generated by the driving motor in the memory, together with the necessary steering torque.

Next, a method for controlling assistance of steering of a vehicle according to various exemplary embodiments of the present invention will be described with reference to FIG. 6.

Figure 6:
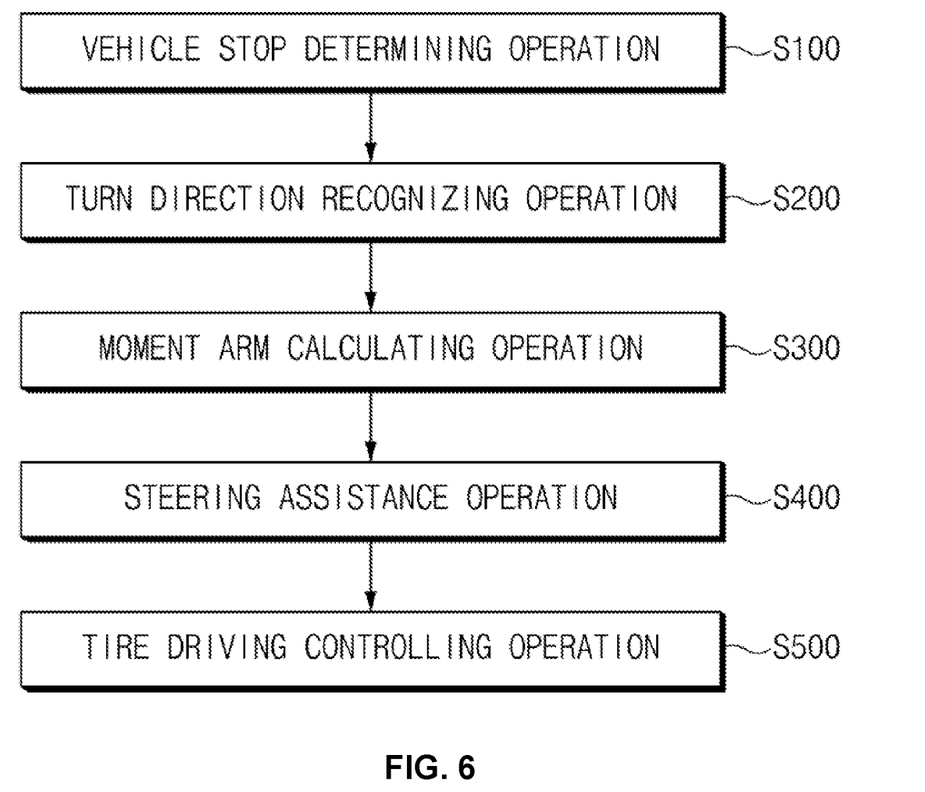
FIG. 6 is a diagram of a method for controlling assistance of steering of a vehicle according to various exemplary embodiments of the present invention.

FIG. 6 is a diagram of a method for controlling assistance of steering of a vehicle according to various exemplary embodiments of the present invention.

Referring to FIG. 6, a method for controlling assistance of steering of a vehicle according to various exemplary embodiments of the present invention may include a turning direction recognizing operation S200 of recognizing a turning direction of a tire, to which the vehicle is turned, by use of a steering angle controlled through manipulation of a handle; and a tire driving controlling operation S500 of determining a tire, to which a first driving force for generating a steering assisting torque that assists turning of the tire to the recognized turning direction, and a tire, to which a second driving force for offsetting the first driving force to maintain a forward/rearward force of the vehicle at 0, and controlling driving motors provided in the tires, respectively, to generate the first driving force and the second driving force.

The turning direction recognizing operation S200 may include an operation of recognizing whether a turning direction of a tire is a right turn or a left turn based on a change of the steering angle through manipulation of a handle.

In the present way, according to the turning direction of the tire recognized in operation S200 of recognizing the turning direction, a tire, to which the first driving force is to be applied, and a tire, to which the second driving force is to be applied, may be determined in the tire driving controlling operation S500.

Accordingly, the present invention may further include a vehicle stop determining operation S100 of determining whether the vehicle is stopped by use of a wheel speed of the vehicle before a change of the steering angle is recognized in the turning direction recognizing operation S200. That is, the present invention is adapted to supplement the steering torque during the steering in the stop state, in which a high steering torque is required, and it is first determined whether the vehicle is stopped.

Furthermore, the tire driving controlling operation S500 may include an operation of determining a tire, to which the first driving force for generating a steering assisting torque that induces turning to the turning direction recognized by the turning direction recognizer, and generating the first driving force that assists turning of the tire by controlling the driving motor provided in the determined tire.

The tire driving controlling operation S500 may include an operation of determining, as tires to which the second driving force is to be applied, an internal rear wheel of the vehicle with reference to the turning direction, to which the tire is turned, as a tire, to which a positive (+) driving force is to be applied, and an external rear wheel of the vehicle as a tire, as a tire, to which a negative (−) driving force is to be applied.

Accordingly, the external front wheel is towed in as the positive (+) driving force is applied thereto and the internal front wheel is towed out as the negative (−) driving force is applied thereto, and thus the steering assisting torque that causes turning of the tire in the direction, to which the tire is to be turned, may be generated.

Furthermore, the tire driving controlling operation S500 may include an operation of determining a tire, to which a second driving force for offsetting the first driving force applied to the tire to generate the steering assisting torque and maintaining the vehicle in the stop state is to be applied such that the vehicle is maintained in the stop state even while the tire is steered, and maintaining the entire forward/rearward force of the vehicle at 0 by controlling the driving motor provided in the determining tire.

To achieve this, the tire driving controlling operation S500 may include an operation of determining, as tires to which the second driving force is to be applied, an internal rear wheel of the vehicle with reference to the turning direction, to which the tire is turned as a tire, to which a positive (+) driving force is to be applied, and an external rear wheel of the vehicle as a tire, to which a negative (−) driving force is to be applied.

Accordingly, because the driving forces applied to the tires to generate the steering assisting torques in the stop state of the vehicle, as illustrated in FIG. 5A and FIG. 5B, are driving forces that are applied to the front wheel and the rear wheel on the same side in opposite directions, the forward/rearward force applied to the entire vehicle may be maintained at 0 by the driving forces, and thus the stop state of the vehicle may be maintained during the steering of the vehicle.

Furthermore, the present invention may further include a moment arm calculating operation S300 of determining a length of the moment arm which is changed when the tire is turned by use of the magnitude of the steering angle, after the turning direction recognizing operation S200.

The moment arm calculating operation S300 may include an operation of determining, in advance, data that represent an increment relationship of the steering angle and a moment arm by use of specification feature values of the vehicle, including installation locations of a kingpin shaft and a steering motor and an offset of a motor shaft, storing the data in a storage unit, such as a memory, and determining and recognizing the lengths of the moment arm matched with the magnitudes of the steering angles from the data stored in the memory and the like.

Furthermore, the present invention may further include a steering assistance determining operation S400 of determining a magnitude of a necessary steering torque required to turn the tire in a left turn direction or a right turn direction in a state, in which the vehicle is stopped, according to the magnitude of the steering angle, and determining to assist a portion of the necessary steering torque with the driving force generated by the driving motor when the necessary steering torque is more than a limit steering torque generated by a steering motor.

Accordingly, the steering assistance determining operation S400 may include an operation of determining that a portion of the necessary steering torque may be burdened in the tire driving controlling operation S500 when the necessary steering torque exceeds the limit steering torque.

In the present way, when it is determined in the steering assistance determining operation S400 that a portion of the necessary steering torque is burdened by the driving motor, a steering assisting torque may be generated in the tire driving controlling operation S500.

Furthermore, the steering assistance determining operation S400 may include an operation of determine a ratio of, in the necessary steering torque, a steering torque which is to be generated by the steering motor and the steering assisting torque which is to be generated by the driving motor.

Furthermore, the steering assistance determining operation S400 may include an operation of matching the magnitude of the necessary steering torque required to turn the tire to the right side or the left side in the stop state as the magnitude of the steering angle increases with the magnitude of the steering angle, storing the matching result in the memory, and determining the necessary steering torque from the memory by use of the magnitude of the steering angle.

Furthermore, the steering assistance determining operation S400 may include an operation of controlling the generation of the steering torque by the steering motor and the generation of the steering assisting torque together by the driving motor only recognizing the magnitude of the steering angle, by storing, by the tire driving controller, the ratio and the magnitude of the steering torque which is to be generated by the driving motor in the memory, together with the necessary steering torque.

The present invention may control such that a portion of a necessary steering torque for turning of a tire may be supplemented and supplied by a driving force of the driving motor so that the steering torque that has to be generated by the steering motor may not be increased, whereby an increase in the weight of the steering motor and an increase in costs may be reduced.

Furthermore, the present invention may turn the tire with a steering torque of a limit steering torque which may be generated by the steering motor through a cooperation with the driving motor so that an increase in the weight and the volume of the steering motor may be minimized, whereby there may be a margin in designing a package of an internal area of the tire.

Furthermore, the present invention may provide various effects that are directly or indirectly recognized.

The above description is a simple exemplification of the technical spirits of the present invention, and the present invention may be variously corrected and modified by those skilled in the art to which various exemplary embodiments of the present invention pertains without departing from the essential features of the present invention.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips.

Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus of assisting steering of a vehicle, the apparatus comprising:
   a turning direction recognizer configured to recognize a turning direction of a tire, to which the vehicle is turned, by use of a steering angle controlled through manipulation of a handle; and
   a tire driving controller configured to determine a tire, to which a first driving force for generating a steering assisting torque that assists turning of the tire to the recognized turning direction is applied, and a tire, to which a second driving force for offsetting the first driving force to maintain a forward/rearward force of the vehicle at 0 is applied, and to control driving motors provided in the tires, respectively, to generate the first driving force and the second driving force,
   wherein the turning direction recognizer is configured to determine the turning direction of the tire based on a determination that the vehicle is stopped.

2. The apparatus of claim 1, wherein the tire driving controller is configured to determine, as tires to which the first driving force is to be applied, an external front wheel of the vehicle with respect to the turning direction, to which the tire is turned, as a tire, to which a positive (+) driving force is to be applied, and an internal front wheel of the vehicle as a tire, to which a negative (−) driving force is to be applied.

3. The apparatus of claim 2, wherein the tire driving controller is configured to determine, as tires to which the second driving force is to be applied, an internal rear wheel of the vehicle with respect to the turning direction, to which the tire is turned, as a tire, to which a positive (+) driving force is to be applied, and an external rear wheel of the vehicle as a tire, to which a negative (−) driving force is to be applied.

4. The apparatus of claim 1, wherein the tire driving controller is configured to perform a control to, when the vehicle in a stop state is steered to be turned to the left, apply, as the first driving force, a positive (+) driving force to a right front wheel of the vehicle and a negative (−) driving force to a left front wheel of the vehicle, and apply, as the second driving force, a positive (+) driving force to a left rear wheel of the vehicle and a negative (−) driving force to a right rear wheel of the vehicle.

5. The apparatus of claim 1, wherein the tire driving controller is configured to perform a control to, when the vehicle in a stop state is steered to be turned to the right, apply, as the first driving force, a positive (+) driving force to a left front wheel of the vehicle and a negative (−) driving force to a right front wheel of the vehicle, and apply, as the second driving force, a positive (+) driving force to a right rear wheel of the vehicle and a negative (−) driving force to a left rear wheel of the vehicle.

6. The apparatus of claim 1, further including:
   a moment arm calculator configured to determine, in advance, data that represent an increment relationship of the steering angle and a moment arm by use of specification feature values of the vehicle, including installation locations of a kingpin shaft and a steering motor and an offset of a motor shaft, to store the data in a memory, and to recognize a length of the moment arm, which is changed when the tire is turned, from the memory by use of a magnitude of the steering angle.

7. The apparatus of claim 1, further including:
   a steering assistance determiner configured to determine a magnitude of a necessary steering torque required to turn the tire in a left turn direction or a right turn direction in a state, in which the vehicle is stopped, according to a magnitude of the steering angle, and determine to assist a portion of the necessary steering torque with the first and second driving forces generated by the driving motors when the necessary steering torque is more than a limit steering torque generated by a steering motor.

8. The apparatus of claim 7, wherein the steering assistance determiner is configured to determine a ratio of, in the necessary steering torque, a steering torque which is to be generated by the steering motor and the steering assisting torque which is to be generated by the driving motors.

9. A method of controlling assistance of steering of a vehicle, the method comprising:
   a vehicle stop determining operation of determining whether the vehicle is stopped;
   a turning direction recognizing operation of recognizing a turning direction of a tire based on a determination that the vehicle is stopped, to which the vehicle is turned, by use of a steering angle controlled through manipulation of a handle; and
   a tire driving controlling operation of determining a tire, to which a first driving force for generating a steering assisting torque that assists turning of the tire to the recognized turning direction, and a tire, to which a second driving force for offsetting the first driving force to maintain a forward/rearward force of the vehicle at 0, and controlling driving motors provided in the tires, respectively, to generate the first driving force and the second driving force.

10. The method of claim 9, wherein the tire driving controlling operation includes:
    determining, as tires to which the first driving force is to be applied, an external front wheel of the vehicle with respect to the turning direction, to which the tire is turned, as a tire, to which a positive (+) driving force is to be applied, and an internal front wheel of the vehicle as a tire, to which a negative (−) driving force is to be applied.

11. The method of claim 10, wherein the tire driving controlling operation includes:
    determining, as tires to which the second driving force is to be applied, an internal rear wheel of the vehicle with respect to the turning direction, to which the tire is turned, as a tire, to which a positive (+) driving force is to be applied, and an external rear wheel of the vehicle as a tire, to which a negative (−) driving force is to be applied.

12. The method of claim 9, further including:
a steering assistance determining operation of, before the tire driving controlling operation, determining a magnitude of a necessary steering torque required to turn the tire in a left turn direction or a right turn direction in a state, in which the vehicle is stopped, according to a magnitude of the steering angle, and determining to assist a portion of the necessary steering torque with the first and second driving forces generated by the driving motors when the necessary steering torque is more than a limit steering torque generated by a steering motor.

13. The method of claim 12, wherein the steering assistance determining operation includes:
determining a ratio of, in the necessary steering torque, a steering torque which is to be generated by the steering motor and the steering assisting torque which is to be generated by the driving motors.

14. The method of claim 9, further including:
performing a control to, when the vehicle in a stop state is steered to be turned to the left, apply, as the first driving force, a positive (+) driving force to a right front wheel of the vehicle and a negative (−) driving force to a left front wheel of the vehicle, and apply, as the second driving force, a positive (+) driving force to a left rear wheel of the vehicle and a negative (−) driving force to a right rear wheel of the vehicle.

15. The method of claim 9, further including:
performing a control to, when the vehicle in a stop state is steered to be turned to the right, apply, as the first driving force, a positive (+) driving force to a left front wheel of the vehicle and a negative (−) driving force to a right front wheel of the vehicle, and apply, as the second driving force, a positive (+) driving force to a right rear wheel of the vehicle and a negative (−) driving force to a left rear wheel of the vehicle.

16. The method of claim 9, further including:
determining, in advance, data that represent an increment relationship of the steering angle and a moment arm by use of specification feature values of the vehicle, including installation locations of a kingpin shaft and a steering motor and an offset of a motor shaft, to store the data in a memory, and to recognize a length of the moment arm, which is changed when the tire is turned, from the memory by use of a magnitude of the steering angle.

* * * * *